Jan. 10, 1950  G. WIKKENHAUSER ET AL  2,493,794
FILM PROJECTION WITH CONTINUOUSLY MOVING FILM
Filed Jan. 6, 1947  3 Sheets-Sheet 1

Inventors
Gustav Wikkenhauser
Albert E. Adams
By Cushman, Darby & Cushman
Attorneys

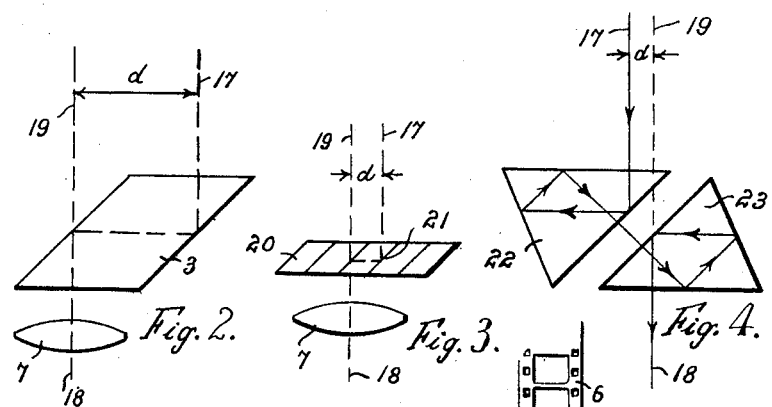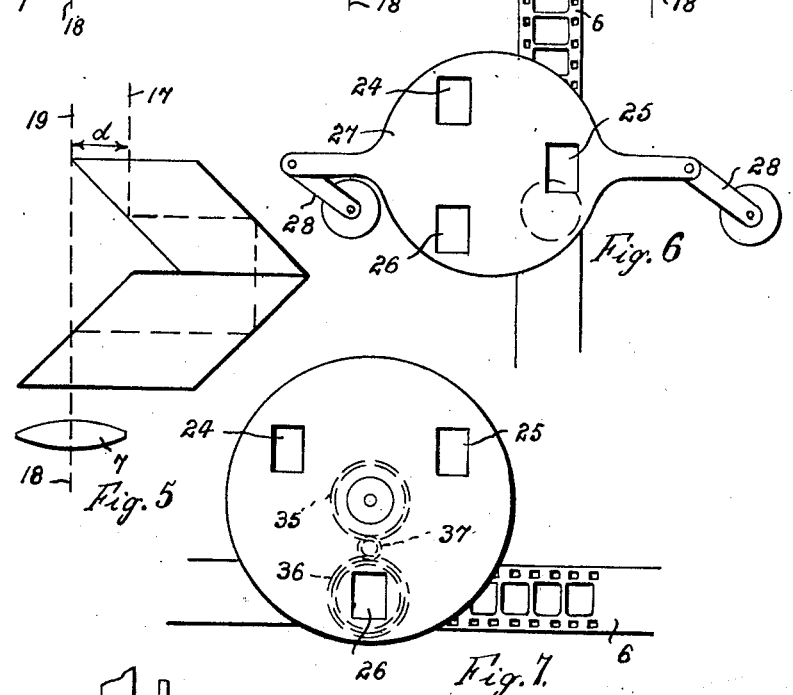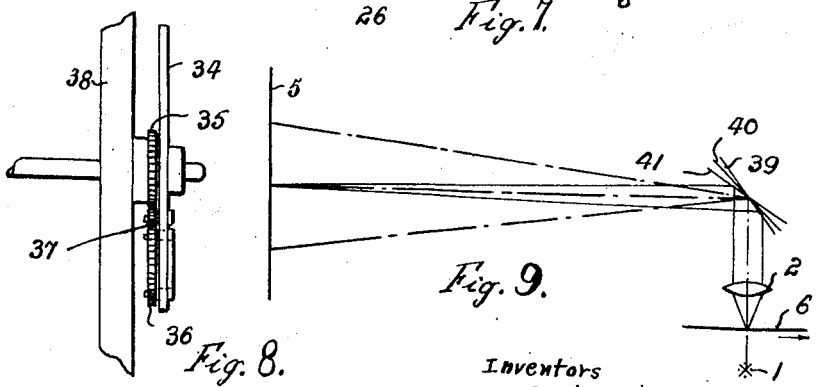

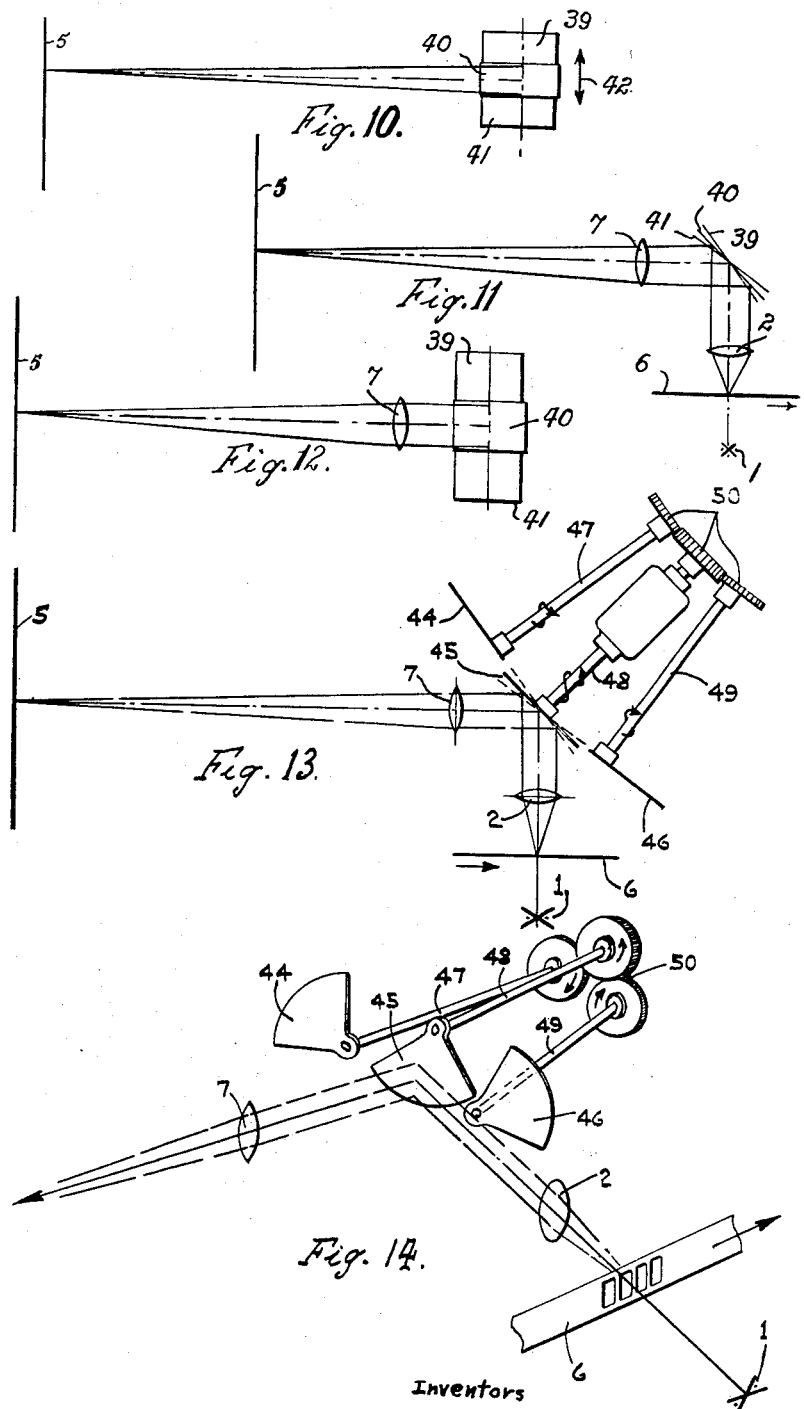

Patented Jan. 10, 1950

2,493,794

UNITED STATES PATENT OFFICE 2,493,794

FILM PROJECTION WITH CONTINUOUSLY MOVING FILM

Gustav Wikkenhauser and Albert E. Adams, Wells, Somerset, England

Application January 6, 1947, Serial No. 720,438
In Great Britain December 21, 1945

Section 1, Public Law 690, August 8, 1946
Patent expires December 21, 1965

10 Claims. (Cl. 88—16.8)

This invention relates to film projection of the type in which the film is made to move continuously.

It is one object of this invention to provide a relatively simple method for carrying out such projection in which a good definition is maintained.

It is another object of the invention to provide a relatively simple method for carrying out such projection in which flicker is avoided.

It is a further object of the invention to provide a relatively simple method for carrying out such projection in which a good definition is maintained and at the same time flicker is avoided.

Yet further objects of the invention consist in the provision of relatively simple apparatus by which the methods hereinbefore defined can be carried out severally or simultaneously.

In projecting a continuously moving film, it is necessary to make the moving picture frames appear stationary on the image screen, and hitherto a relatively complicated optical system has been provided for this purpose. The film has been illuminated continuously or by means of an alternating light source, and the optical means have served to counteract the motion of the film and have therefore required to be of high quality to ensure exact compensation for the film movement.

It has also been proposed to illuminate a continuously moving film with flashes of such short duration that the movement of the film during a flash does not result in perceptible loss of definition. With a normal film the speed of projection is 24 frames per second and the picture resulting from illuminating by one flash per frame results in flicker.

In co-pending application Serial No. 616,761 there is described a method and means for projecting continuously moving film in which each frame is illuminated by a small plurality of flashes and in which light deflecting means are provided for compensating for the movement of the film which takes place between successive flashes. It will be appreciated that the light deflecting means needed for compensating for film movement between a small number, such as two or three, flashes per frame are of a very much simpler and cheaper kind than those required when continuous or nearly continuous correction has to be provided for film movement.

The deflecting means as described in the co-pending specification referred to are refractive and it has now been found that certain advantages are to be had by the employment of reflective means for effecting the displacement.

It is accordingly a further object of this invention to provide reflecting instead of refractive means for effecting the light deflection in apparatus such as is described in the co-pending specification referred to.

The manner in which the stated objects and other objects of the invention can be attained will be understood from the following description and from the accompanying drawings in which:

Fig. 2 is a diagram of the light deflecting means of Fig. 1,

Figure 1:
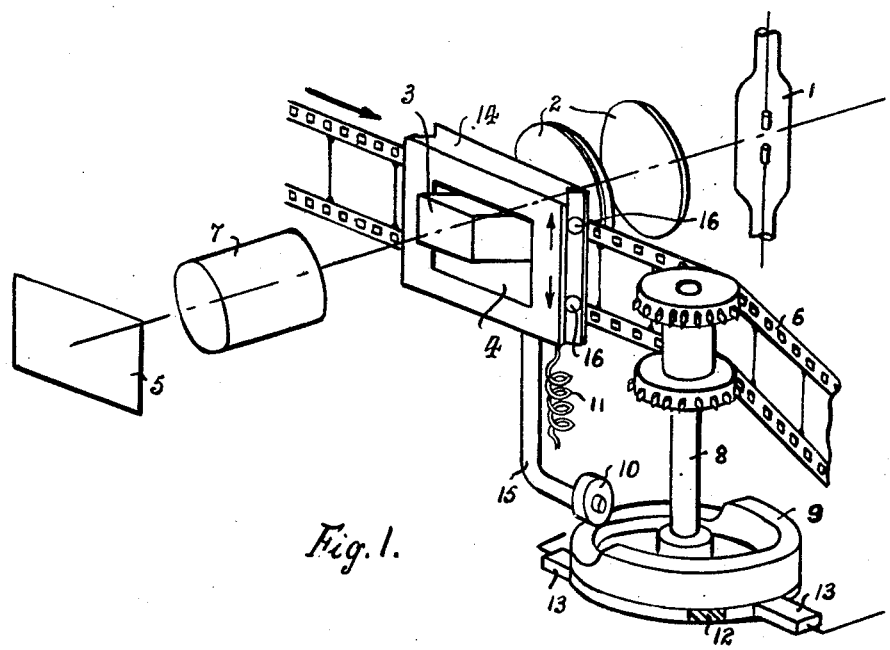
Fig. 1 is a diagrammatic perspective view of one embodiment of the invention.

Figs. 3 to 5 illustrate diagrammatically various forms of deflecting means that can be used in the present invention, Figs. 6 and 7 are somewhat diagrammatic views in front elevation of various mechanisms which can be used to bring the deflecting means successively into the light path, Fig. 8 is a view in side elevation of the mechanism of Fig. 7, Figs. 9 and 10 are diagrams in elevation and plan respectively showing alternative deflecting means which may be used in the present invention, Figs. 11 and 12 are diagrams corresponding to those in Figs. 10 and 11 including a modification, and Figs. 13 and 14 are diagrammatic views in elevation and perspective respectively of a preferred deflecting system for use in carrying out the invention.

Like parts are given the same references in all the figures of the drawings.

Referring to Fig. 1, light from a source 1 which may be a discharge lamp fed with electric pulses of very short duration, for example 1/24000 second, is passed through a condensing lens system 2 on to a film 6 which is moved continuously by sprockets upon a shaft 8. After traversing the film 6 the light passes through deflecting means comprising a carrier 14 having mounted within it a prism 3 below which is an aperture 4. Light emerging from the deflecting means passes through a projecting lens 7 on to an image screen indicated at 5 although it will obviously usually be such larger than shown and at a much greater distance from the lens 7.

The carrier 14 is mounted to be slidable up and down in the directions of the arrows thereon in suitable bearings indicated by balls 16, and is fixed to an arm 15 carrying a roller 10 resting upon a cam 9. The roller 10 is held in engagement with the surface of the cam 9 by a spring 11.

The film driving shaft 8 also carries a switch member comprising two contacts 12 (one not shown being diametrically opposite to that shown) which co-operate with a pair of brushes 13 which are arranged in series in the circuit of the lamp 1 and serve to close the circuit and apply a pulse of current from a source not shown to the lamp twice in every revolution of the switch member and twice for every frame of the film 6. The lamp 1 is thus caused to produce two very brief flashes of light during the passage of each frame of the film 6 past the deflecting means 14, 3. The cam 9 also moves the carrier 14 in such a manner that it is in the lower position shown shown with the prism 3 in the light path during one flash and in the upper position with the clear aperture 4 in the light path during the next flash.

The effect of the prism 3 will be best understood from Fig. 2. When the prism is in the light path the light reaching the axis 18 of the projecting lens 7 proceeds from the film 6 along the path 17 after double reflection within the prism, whereas when the prism 3 is removed from the light path the light path is from the film along the line 19 to the projecting lens 7. A displacement $d$ is thus produced and this is made equal to the distance travelled by the film 6 in the interval between successive flashes.

With the arrangement of Figs. 1 and 2 the light grasp is dependent upon $d$ and for a given value of $d$ therefore the light grasp is limited. In order to avoid this limitation there may be used in place of the prism 3 a multiple prism 20 as shown in Fig. 3, the interfaces such as 21 being rendered reflecting, by silvering or aluminising for example. In this case the light grasp is not limited by the displacement $d$.

Other examples of deflecting means in which the light grasp is not limited by the deflection $d$ are shown in Figs. 4 and 5. The example of Fig. 4 has the advantage that the value of $d$ is adjustable by varying the distance between the two prisms 22 and 23.

When three flashes are provided per frame it is usually convenient to provide two deflecting means, the three different light paths being obtained with the two deflecting means brought into operation for two of the paths and with both removed for the third path. It may be necessary to correct for the difference in optical path length associated with the interposition of a deflecting means and the absence of such means. There are two influences which act in opposition to one another, namely (a) the increased geometrical path length when the deflecting means are operative compared with when they are absent and (b) the effect of the refractive index of the deflecting means being greater than unity. The effect of (a) must be greater than or equal to that of (b). In some cases when the effects are substantially equal no correction may be required. In other cases a glass plate of suitable thickness is inserted into the light path when the deflecting means are absent to supplement the refraction under (b) and render the total refraction effect approximately equal to effect (a).

Although it will not be possible to achieve optimum optical correction of optical aberrations for all three conditions, a satisfactory compromise can be made. When a plurality of like deflecting means are used in association with an equal plurality of flashes per frame, this difficulty will not arise.

Instead of oscillating the deflecting devices such as those of Figs. 2 to 5 into and out of the light path as shown in Fig. 1 they may be rotated, the means for effecting the rotation being such that the deflecting devices are kept in an upright position while they cross the light path. Examples of such means are shown in Figs. 6 to 8. In Fig. 6, three deflecting devices 24, 25 and 26 (one of which may be omitted and if necessary replaced by a correcting plate as above described) are fixed in apertures in a carrier 27 which is given a gyratory motion by means of cranks 28 suitably geared to the film advancing mechanism. It is arranged that the cranks 28 make one revolution per frame of the film 6 and a flash occurs as each device 24, 25 or 26 is in the light path in turn. In this example three flashes take place per frame.

In Figs. 7 and 8 which is also for use with three flashes per frame the devices 24, 25 and 26 are rotatably mounted on a carrier 34. A gear wheel 35 is fixed to a fixed support 38 and gear wheels 36 (of which only that associated with the device 26 is shown) are fixed to the devices 24, 25 and 26. The gear wheels 35 and 36 are coupled by pinions 37 (of which there are three) rotatably mounted on the carrier 34. The gearing serves to maintain the devices upright as the carrier 34 rotates.

Figs. 9 and 10 show a further form of deflecting means also for use with three flashes per frame, namely plain mirrors 39, 40 and 41 which are moved to and fro in the direction of the arrows 42. The mirrors are moved in one direction during a frame, a flash occurs whilst each is in the light path, and the mirrors are returned to their starting positions in the interval between the last flash of one frame and the first flash of the next frame. This arrangement has the disadvantage that the position of the image screen 5 must be adjusted in order to focus the image on the screen. In the arrangement of Figs. 11 and 12 this is rendered unnecessary by the arrangement of the deflecting mirrors in a part of the beam which is parallel and by providing a second optical system 7 corresponding to the projection lens of Fig. 1 which can be adjusted for focusing purposes.

In the arrangement of Figs. 13 and 14, also for use with three flashes per frame, the deflecting means are in the form of mirrors 44, 45 and 46 mounted upon rotatable shafts 47, 48 and 49 respectively and having their reflecting surfaces perpendicular to the shaft axes. The shafts are inclined relatively to one another in such a manner that the desired deflections are obtained. The shafts are driven through gearing 50 by a motor 51 which in turn is geared to the film advancing mechanism. The mirrors are of sector shape whereby they can swing in turn into the light path. The positions of the mirrors 44 and 46 when in the light path are indicated in dotted lines in Fig. 13.

The flashes of illumination may be produced by means of a substantially steady light source in co-operation with a shutter device, for instance a mechanical shutter, by means of a flashing light source without a shutter, or by means of a combination of a flashing light source and a shutter. In the last case it may be arranged that the duration of the illumination is determined by the shutter and that the flashes last somewhat longer than the desired duration of illumination.

The light source 1 may be a high pressure mercury vapour lamp.

We claim:
1. Apparatus for projecting spatially station- ary pictures from continuously moving film comprising means for strongly illuminating each picture frame of said film in succession by a small plurality of flashes of duration only a very small fraction of one frame period, said flashes being so brief that no compensation for the movement of the film which occurs during such flashes is required, means for projecting the picture frames on to a screen by the light by which they are so illuminated and means for compensating for the movement of the film in the time interval between any two successive flashes during one frame period, said compensating means comprising a light reflecting element having at least one reflecting surface and means for moving said element rectilinearly into and out of the path of the projecting light once during each frame period, whilst maintaining the plane of said reflecting surface parallel to itself.

2. Apparatus according to claim 1, wherein said rectilinear motion is in a direction substantially parallel to that of movement of the film.

3. Apparatus for projecting spatially stationary pictures from continuously moving film comprising means for strongly illuminating each picture frame of said film in succession by a small plurality of flashes of duration only a very small fraction of one frame period, said flashes being so brief that no compensation for the movement of the film which occurs during such flashes is required, means for projecting the picture frames on to a screen by the light by which they are so illuminated and means for compensating for the movement of the film in the time interval between any two successive flashes during on frame period, said compensating means comprising a small plurality of light reflecting elements having reflecting surfaces slightly inclined angularly relatively to one another and means for displacing said elements in the planes of said surfaces successively into and out of the path of the projecting light.

4. Apparatus according to claim 3 wherein said displacing means serve to rotate said elements whilst maintaining said surfaces in their own planes.

5. Apparatus according to claim 3 wherein said displacing means serve to displace said elements rectilinearly whilst maintaining said surfaces in their own planes.

6. Apparatus for projecting spatially stationary pictures from continuously moving film comprising means for strongly illuminating each picture frame of said film in succession by a small plurality of flashes of duration only a very small fraction of one frame period, said flashes being so brief that no compensation for the movement of the film which occurs during such flashes is required, means for projecting the picture frames on to a screen by the light by which they are so illuminated and means for compensating for the movement of the film in the time interval between any two successive flashes during one frame period, said compensating means comprising a light reflecting element having at least one reflecting surface and means for moving said element into and out of the path of the projecting light once during each frame period, whilst maintaining the plane of said reflecting surface parallel to itself.

7. Apparatus for projecting spatially stationary pictures from continuously moving film comprising means for strongly illuminating each picture frame of said film in succession by a small plurality of flashes of duration only a very small fraction of one frame period, said flashes being so brief that no compensation for the movement of the film which occurs during such flashes is required, means for projecting the picture frames on to a screen by the light by which they are so illuminated and means for compensating for the movement of the film in the time interval between any two successive flashes during one frame period, said compensating means comprising at least one light reflecting element having a reflecting surface and means for rotating said element about an axis to move said surface alternately into and out of the path of the projecting light.

8. Apparatus according to claim 7 wherein said compensating means comprise a plurality of said elements each mounted for rotation about a separate axis, said axes being inclined relatively to one another, and means for rotating said elements about said axes to move the reflecting surfaces thereof successively into and out of the path of the projecting light.

9. Apparatus for projecting spatially stationary pictures from continuously moving film comprising means for strongly illuminating each picture frame of said film in succession by a small plurality of flashes of duration only a very small fraction of one frame period, said flashes being so brief that no compensation for the movement of the film which occurs during such flashes is required, means for projecting the picture frames on to a screen by the light by which they are so illuminated and means for compensating for the movement of the film in the time interval between any two successive flashes during one frame period, said compensating means comprising at least one light reflecting element having a reflecting surface and means for rotating said element to move said surface into and out of the path of the projecting light whilst maintaining said surface parallel to itself.

10. Apparatus for projecting spatially stationary pictures from continuously moving film comprising means for strongly illuminating each picture frame of said film in succession by a small plurality of flashes of duration only a very small fraction of one frame period, said flashes being so brief that no compensation for the movement of the film which occurs during such flashes is required, means for projecting the picture frames on to a screen by the light by which they are so illuminated and means for compensating for the movement of the film in the time interval between any two successive flashes during one frame period, said compensating means comprising a light reflecting element and means for moving said element into the path of the projecting light before one of said flashes and for removing it from said path after such flash.

GUSTAV WIKKENHAUSER.
ALBERT E. ADAMS.

REFERENCES CITED

The following references are of record in the file of this patent:

UNITED STATES PATENTS

| Number | Name | Date |
| --- | --- | --- |
| 2,113,194 | Dorgello | Apr. 5, 1938 |
| 2,186,013 | Edgerton | Jan. 9, 1940 |
| 2,257,938 | Clothier | Oct. 7, 1941 |

FOREIGN PATENTS

| Number | Country | Date |
| --- | --- | --- |
| 472,013 | Great Britain | Sept. 15, 1937 |